(12) United States Patent
Konruff et al.

(10) Patent No.: US 9,416,866 B2
(45) Date of Patent: Aug. 16, 2016

(54) VERTICAL GEAR MOTOR PLANETARY GEAR LUBRICATION SYSTEM

(71) Applicant: Baldor Electric Company, Fort Smith, AR (US)

(72) Inventors: Michael E. Konruff, Simpsonville, SC (US); Chuong Nguyen, Simpsonville, SC (US)

(73) Assignee: Baldor Electric Company, Fort Smith, AR (US)

( * ) Notice: Subject to any disclaimer, the term of this patent is extended or adjusted under 35 U.S.C. 154(b) by 61 days.

(21) Appl. No.: 14/333,703

(22) Filed: Jul. 17, 2014

(65) Prior Publication Data

US 2016/0017982 A1    Jan. 21, 2016

(51) Int. Cl.
*F16H 57/04* (2010.01)
*F16H 57/08* (2006.01)

(52) U.S. Cl.
CPC .......... *F16H 57/0431* (2013.01); *F16H 57/046* (2013.01); *F16H 57/0409* (2013.01); *F16H 57/0479* (2013.01); *F16H 57/0482* (2013.01); *F16H 57/043* (2013.01); *F16H 57/0421* (2013.01); *F16H 57/0456* (2013.01); *F16H 2057/085* (2013.01)

(58) Field of Classification Search
CPC .............. F16H 57/0431; F16H 57/046; F16H 57/0479; F16H 57/0482; F16H 57/0421; F16H 57/043; F16H 57/0456; F16H 2057/085
USPC .................................. 475/159, 160; 184/6.12
See application file for complete search history.

(56) References Cited

U.S. PATENT DOCUMENTS

| | | | |
|---|---|---|---|
| 1,299,156 A * | 4/1919 | Fast | F16H 57/0482 184/6.12 |
| 3,321,999 A | 5/1967 | Greer | |
| 4,590,820 A | 5/1986 | Hambric | |
| 4,655,326 A | 4/1987 | Osenbaugh | |
| 4,957,187 A * | 9/1990 | Burgess | B01D 19/0052 184/6.12 |
| 5,967,929 A | 10/1999 | Matsuoka et al. | |
| 6,202,814 B1 | 3/2001 | Braford, Jr. | |

(Continued)

FOREIGN PATENT DOCUMENTS

EP    0164968 A1    12/1985

OTHER PUBLICATIONS

Co-Pending U.S. Appl. No. 14/333,667, filed Jul. 17, 2014, Inventors: Konruff, M.; Russell, C.; Nguyen, C., (Not Yet Published).

(Continued)

*Primary Examiner* — Roger Pang
(74) *Attorney, Agent, or Firm* — Thompson Coburn LLP (57) ABSTRACT

A planetary gear train is lubricated via a distribution ring and a planet gear carrier oil supply passage in communication with the distribution ring. The gear train includes a sun pinion that engages a planet gear at a sun planet gear mesh. The planet gear is rotatably mounted to a planet gear carrier. The planet gear carrier is configured to drive an output shaft. The output shaft may be operatively connected to a load. The planet gear rotates within a ring gear at a planet gear ring mesh. The distribution ring surrounds a planet gear carrier and has a hollow interior that communicates with an oil supply. A planet gear carrier oil supply passage may extend through a planet gear carrier of the gear train and supply oil to a sun planet gear mesh and the planet ring gear mesh, and bearings of the planetary gear train.

20 Claims, 10 Drawing Sheets

(56) References Cited

U.S. PATENT DOCUMENTS

| | | | | |
|---|---|---|---|---|
| 7,513,172 | B2* | 4/2009 | Takahashi | F16H 57/0423 184/6.12 |
| 8,025,601 | B2* | 9/2011 | Iwasaki | F16H 3/66 475/159 |
| 8,267,826 | B2* | 9/2012 | Duong | F16H 57/042 475/159 |
| 8,702,373 | B1* | 4/2014 | Valva | F01D 25/20 415/111 |
| 2007/0197339 | A1 | 8/2007 | Ryymin et al. | |
| 2009/0179387 | A1* | 7/2009 | Saenz De Ugarte | F16J 15/441 277/563 |
| 2010/0179011 | A1* | 7/2010 | Demtroder | F03D 11/0008 475/159 |
| 2010/0304912 | A1 | 12/2010 | Sime | |
| 2012/0108380 | A1 | 5/2012 | Dinter et al. | |
| 2013/0035190 | A1* | 2/2013 | McCune | F02C 7/32 475/159 |
| 2013/0095974 | A1* | 4/2013 | Imai | F16H 57/0479 475/159 |
| 2013/0319006 | A1* | 12/2013 | Parnin | F01D 25/18 60/805 |
| 2014/0041619 | A1* | 2/2014 | Yamauchi | B60K 7/0007 123/196 R |

OTHER PUBLICATIONS

Co-Pending U.S. Appl. No. 14/457,649, filed Aug. 12, 2014, Inventors: Esterle, T.; Konruff, M.; Nguyen, C.; Russell, C.; Asher, J., (Not Yet Published).

Co-Pending U.S. Appl. No. 14/477,166, filed Sep. 4, 2014, Inventors: Konruff, M.; Nguyen, C.; Russell, C.; Asher, J.; Dejong, J.; Esterle, T., (Not Yet Published).

Co-Pending U.S. Appl. No. 14/453,034, filed Aug. 6, 2014, Inventors: Konruff, M. (Not Yet Published).

* cited by examiner

VERTICAL GEAR MOTOR PLANETARY GEAR LUBRICATION SYSTEM

SUMMARY

This disclosure relates to a planetary gear lubrication system. In one aspect, the disclosure relates to a lubrication system associated with a planetary gear train used in a vertical gear motor application. In one type of vertical gear motor application, a motor, for instance, an AC induction or synchronous motor, may be directly mounted to a housing structure and connected to the gear train in the housing with a flexible coupling. In one aspect, the planetary gear system may have four major components. A sun gear may be used to provide high-speed input to the gear train. Around the sun gear, planet gears may be arranged. The planet gears may be supported by a planet carrier. The planet carrier may be connected to a low-speed output and the driven equipment. The entire planet gear carrier assembly (i.e., sun gear, planet gears, and planet carrier) may rotate inside a ring gear. The gear carrier may then drive the driven load through an output shaft. The shafts and gears of the planetary gear system may be made of high-alloy hardened and carburized steel for durability and strength. The gears may be double helical type gears for low noise and low vibration. The planetary gear system may be a single-stage reduction, for instance, 3:1 to 9:1. Speed control of the planetary gear system may be accomplished through a drive system associated with the motor. For instance, the planetary gear system may operate without a clutch, and the motor speed may be varied to change output, for instance, by using a variable frequency drive with a synchronous motor. In the alternative, depending upon the application, speed control may be accomplished through a clutch pack associated with the gear system. In the gear system with the clutch pack, the clutch pack transmits torque between friction plates. The gear train divides the power into multiple paths to reduce the load on individual gearing, affording high-power density and high efficiency. The clutch pack controls the speed of the driven equipment to enhance system operation. For instance, the clutch pack allows the motor to achieve motor base speed under a no-load condition. The clutch pack can then be engaged and controlled to gradually bring the driven load to full speed. For instance, after the motor is started, the clutch may be engaged slowly to accelerate the load under a controlled acceleration curve, minimizing the impact on the power system and allowing for extended acceleration and deceleration times. In another aspect, the clutch functions as a mechanical soft start that allows the driven load to stop without stopping the motor. In another aspect, the driven equipment may be started and stopped repeatedly by engaging and disengaging the clutch without stopping the motor. The lubrication system provides lubricant to components of the system, including the aforementioned components, in sufficient levels to provide lubrication without losses due to excessive oil levels, and to improve efficiency.

DETAILED DESCRIPTION

Figure 1:
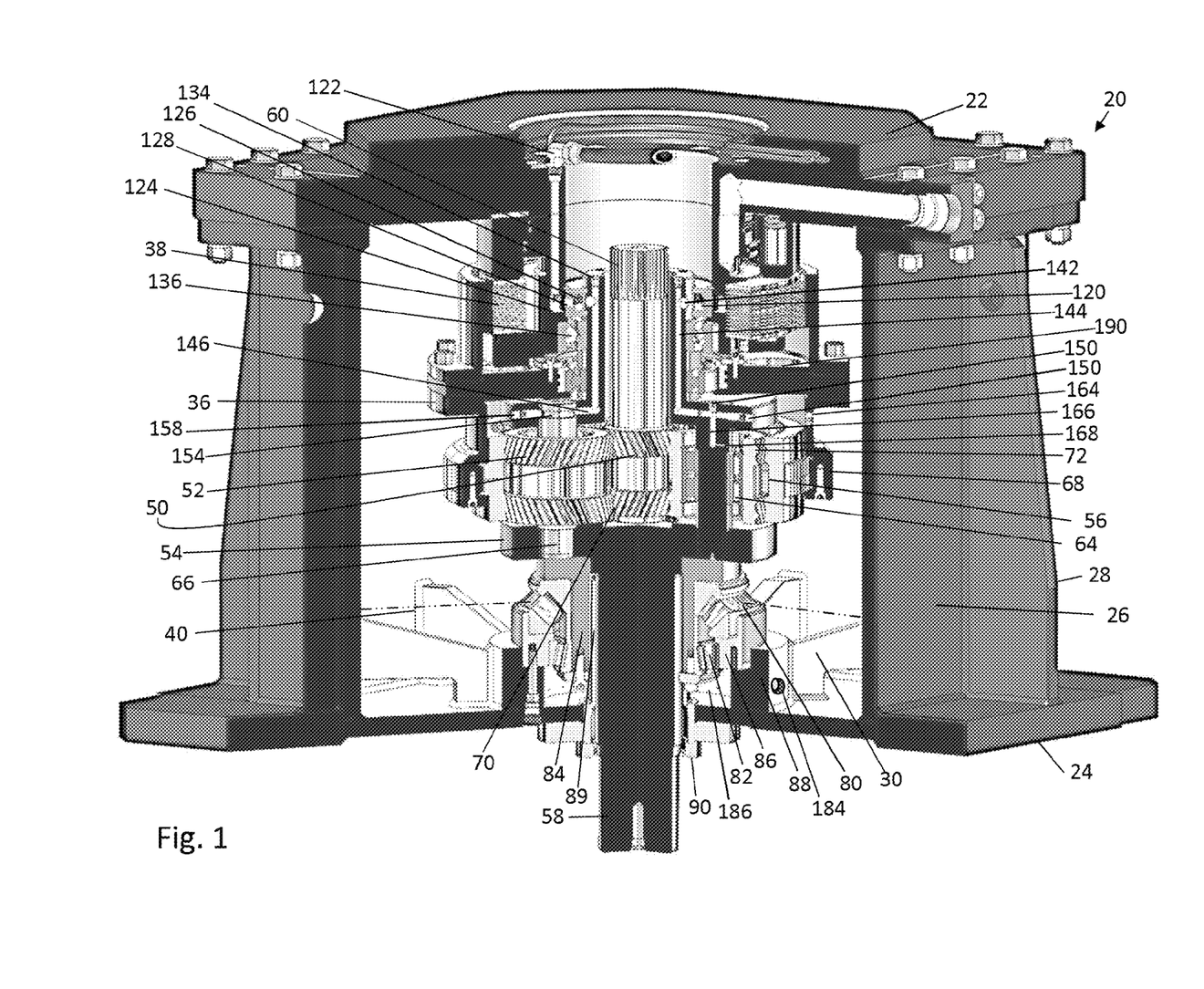
FIG. 1 shows a housing and planetary gear system including a clutch pack with certain features of the housing and gear system shown cut away for ease of illustration.
Figure 2:
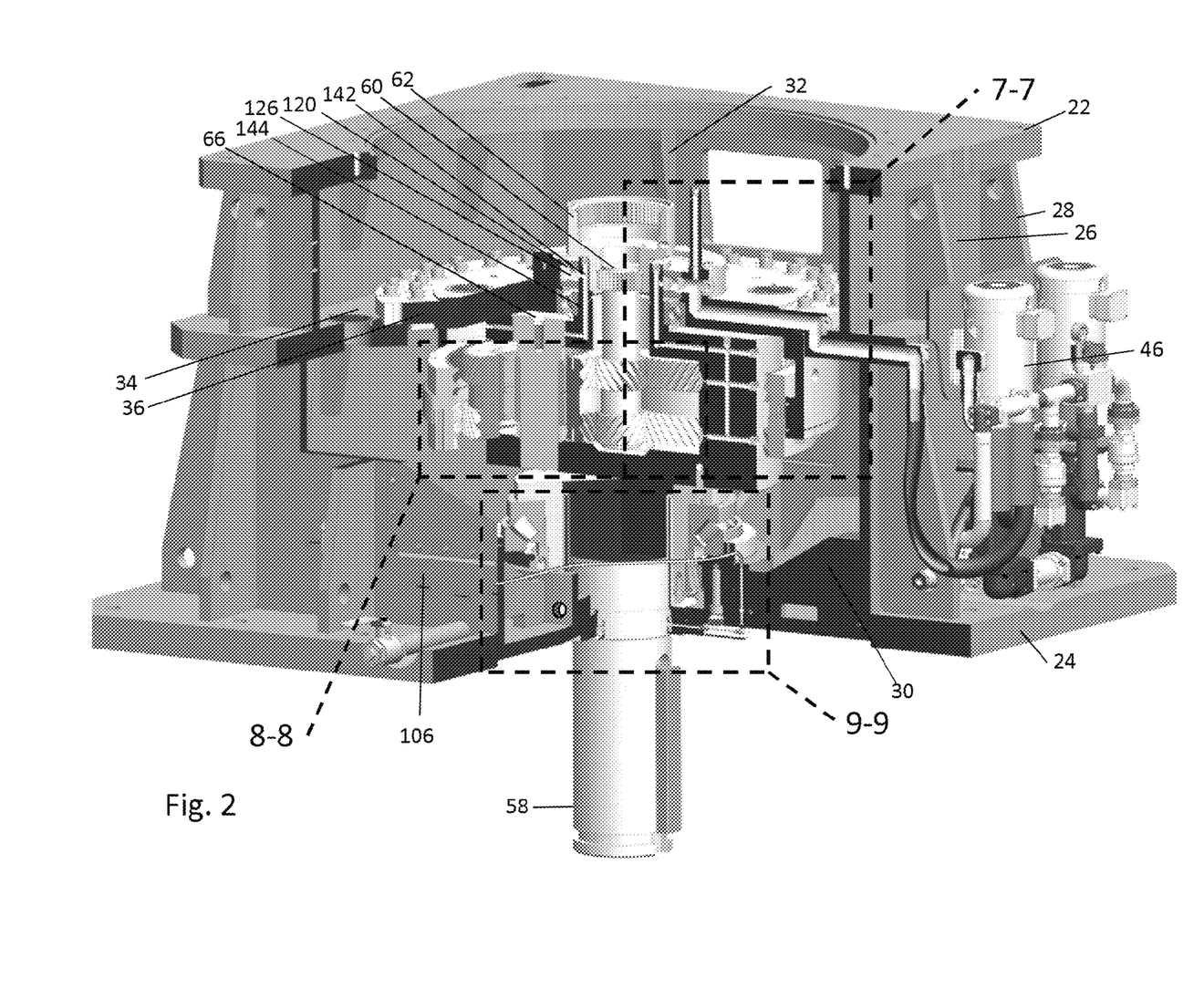
FIG. 2 shows an exemplary housing and planetary gear train without a clutch pack with certain components of the housing and gear system shown cut away for ease of illustration.
Figure 3:
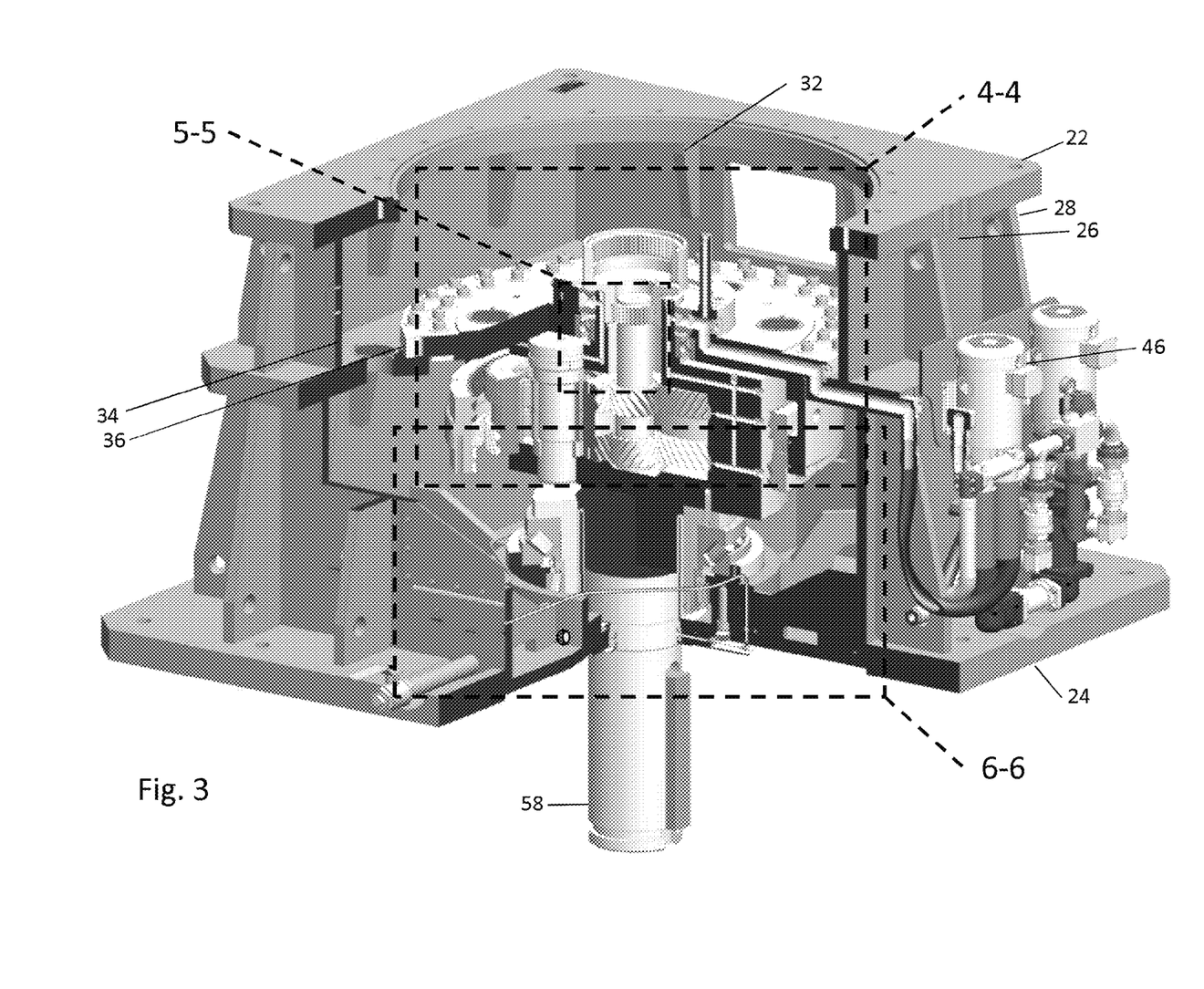
FIG. 3 is an alternate view of the housing and planetary gear train without a clutch pack with certain components of the housing and gear system shown cut away for ease of illustration.

The housing 20 containing the planetary gear train may comprise a fabricated steel housing including a top weldment plate 22 which provides a mount for a motor (not shown). Opposite the top weldment plate 22, the housing may be provided with a base weldment plate 24. The base weldment plate 24 may provide a mount to a driven load (not show), for instance, a pump. Between the top and base weldment plates 22,24, side walls 26 are provided. Together the top weldment plate 22, base weldment plate 24, and side walls 26 define a hollow interior of the housing 20 in which the planetary gear system is disposed. The housing 20 may also have side flanges 28 extending between the top weldment plate 22 and base weldment plate 24 to provide structural support for the side walls 26. Within the interior of the housing, the housing may be provided with gussets to provide additional structural support. For instance, as shown in FIGS. 1, 2 and 3, the housing is provided with lower interior gussets 30 extending between the base weldment plate 24 and the side walls 26. The lower interior gussets 30 may extend in a radial pattern across the base weldment plate. Additionally, as shown in FIGS. 2 and 3, the housing may be provided with upper interior gussets 32. The upper interior gussets 32 may extend between the top weldment plate 22 and the side walls 26. Depending upon the application, the housing may be provided with an intermediate support plate 34. For instance, as shown in FIGS. 2 and 3, the intermediate support plate 34 is disposed between the top weldment plate 22 and the base weldment plate 24 and extends into the interior of the housing from its connection with the side walls 26. In the embodiment of FIGS. 2 and 3, the intermediate support plate 34 may be used to allow attachment of a ring gear support member 36. In FIGS. 2 and 3, the gear train does not include a clutch, and the ring gear support member 36 may be mounted directly to the intermediate support plate 34. FIG. 1 shows an alternate configuration with the planetary gear train including a clutch pack 38 and without an intermediate support plate. The clutch pack 38 and ring gear support member 36 are operatively connected to the top weldment plate 22 with the clutch pack configured to be mounted to the ring gear support member and other components of the clutch operatively mounted to the top weldment plate.

A portion of the interior of the housing 20 may form a sump 40 for a lubrication system of the planetary gear train. However, to maintain minimal amounts of oil and prevent losses from excessive oil levels in the interior of the housing, a lubrication system which directs oil to critical components of the planetary gear system may be used as explained in greater detail below. Accordingly, only the lower portion of the interior of the housing may comprise the sump 40 such that the housing is only partially filled with oil. In particular, the interior of the housing may be filled with oil at a level equal to the height of a lower output bearing assembly, as will be discussed below in greater detail. An oil filtration and pressurizing equipment 46 may communicate with the sump 40 through connections in the structural members of the housing. Depending upon the application, oil from the oil supply may be directed through the intermediate support plate 34 (FIGS. 2, 3) or through the top weldment plate 22 (FIG. 1). Oil filtration and pressurizing equipment 46 may be provided adjacent to an exterior side wall of the housing.

As mentioned earlier, in one aspect, the planetary gear system may have four major components. A sun pinion 50 may be used to provide high-speed input to the gear train. Around the sun gear 50, planet gears 52 may be arranged with the sun pinion driving the planetary gears. The planet gears 52 may be supported by a planet carrier 54. The entire planet gear carrier assembly (i.e., sun gear, planet gears, and planet carrier) may rotate inside a ring gear 56. The planet carrier 54 may be connected to a low-speed output and the driven equipment through an output shaft 58. The planet gear carrier 54 may be integrally or monolithically connected with the output shaft 58. The sun pinion 50 may be driven by an input shaft 60. Opposite the sun pinion 50, the input shaft may be splined and connected to the motor (not shown) via a motor coupling hub 62. The motor coupling hub 62 may have splines which engage the output shaft of the motor (not shown). The sun pinion 50 may be spaced from the motor coupling hub 62 along the input shaft 60. The gear system may include three planet gears that may be rotatably mounted to the planet gear carrier 54. The planet gears 52 may have planet gear bearings 64 that are mounted to planet gear spindles 66. The planet gear spindles 66 may be mounted to the planet gear carrier 54, and the planet gears 52 may rotate relative thereto via the planet gear bearings 64. The ring gear 56 may be mounted to a ring gear carrier 68 which surrounds the planet gears 52 and sun pinion 50. The ring gear carrier 68 may be supported in the hollow interior of the housing by the ring gear support member 36. The ring gear support member 36 may include a plate portion arranged generally horizontally in the interior of the housing and an annular portion depending therefrom that forms a mount for the ring gear carrier 68. Depending upon the application, the clutch pack 38 may be supported by the ring gear support member 36 (FIG. 1). In applications without a clutch pack, the ring gear support member is mounted to the intermediate support plate 34 (FIGS. 2-3). The sun pinion 50 may engage with each of the planet gears 52 at a respective sun planet gear mesh 70, and each of the planet gears 52 may engage with the ring gear 56 at a respective planet ring gear mesh 72.

The planetary gear system may include an output bearing assembly. The output bearing assembly may be located towards the bottom of the housing adjacent to the base weldment plate 24. The output bearing assembly may include an output thrust bearing 80, an output spindle bearing 82, and an output bearing assembly carrier with inner and outer portions 84,86. The output bearing assembly inner carrier 84 may be mounted to the planet gear carrier 54. The output bearing assembly outer carrier 86 may be mounted to an annular outer carrier mounting ring 88 formed in the base of the housing. For instance, as shown in the drawings, the output bearing assembly outer carrier 86 is mounted to the outer carrier mounting ring 88 projecting upward from the base weldment plate 24.

The housing may also be provided with a drywell configuration around the output shaft. A tubular extension 89 may project upward (FIG. 1) from the base weldment plate 24 adjacent to the output opening of the housing. The tubular extension 89 may have an inner diameter surface dimensioned to establish a clearance volume with the output shaft 58 and an outer diameter surface dimensioned to establish a clearance volume with the output bearing assembly inner carrier 84. The tubular extension 89 may project upward with an axial height sufficiently above the level of oil in the sump 40. The clearance volume between the output shaft 58 and tubular extension inner diameter surface may be normally dry (i.e., oil-free) and the clearance volume between the tubular extension outer diameter surface and the output bearing assembly inner carrier 84 may have an oil level equal to the oil level in the sump. Because the distal end of the tubular extension 89 is located above the level of oil in the sump, oil in the clearance volume between the tubular extension outer diameter surface and the output bearing assembly inner carrier 84 does not communicate with the clearance volume between the output shaft 58 and tubular extension inner diameter surface.

An output sleeve seal 90 may be provided between the base weldment plate 24 and the output shaft 58. The output sleeve seal 90 prevents debris, foreign materials, moisture and humidity from entering the gear box along the output shaft into the housing interior. The output sleeve 90 also provides a secondary seal to the drywell should the clearance volume between the output shaft 58 and tubular extension inner diameter surface become filled. The air gap in the clearance volume between the output shaft 58 and tubular extension inner diameter surface The output shaft seal may be filled with grease. Grease may be injected into the seal 90 through a grease fill or injection line 92 which extends from an injection port 94 (e.g., a zerk fitting) located outside of the housing through the interior of the housing and the oil sump 40. Depending upon the size of the output bearing assembly and the size of output bearing assembly inner and outer carriers 84,86, and the diameter of carrier mounting ring 88, the grease fill line 92 or a portion thereof may also extend through the output bearing assembly outer carrier. For instance, the drawings show a portion 96 of the grease fill line extending from the housing interior and oil sump through the output bearing assembly carrier mounting ring 88 before entering the grease seal 90. However, if the output bearing carrier has a smaller diameter, depending upon the application, the grease fill line may extend directly from the housing interior and the oil sump to the grease seal. In addition to or in the alternative, the grease fill line may have a portion 98 extending through a recess 100 formed in the base weldment plate 24 before entering the grease seal 90. The recess 100 formed in the base weldment plate for the fill line portion 98 may be covered with a protective cover 102 to prevent the line from being crushed or kinked during shipping, installation or normal running conditions. Extending the grease fill line through the oil sump 40 allows the grease to be warmed by the oil in the sump, thereby allowing the grease to flow easier from outside of the housing to the grease seal. Also, extending the injection line 92 through the interior of the housing prevents the injection line from being crushed or kinked during shipping, installation or normal running conditions. The grease seal 90 may also have a grease discharge line 104. The grease discharge line 104 may run from the grease seal 90 through the oil sump in the interior of the housing to a discharge port 106 located exterior of the housing. The discharge port 106 may be located on the housing adjacent to the injection port 94. This allows an operator to visually determine when the grease seal is filled as grease will be discharged from the discharge port 106 as the operator is injecting grease through the injection port 94. The discharge line may have a portion 108 extending through a recess 110 formed in the base weldment plate 24 from the grease seal. In addition to or in the alternative, a portion of the discharge line 110 may extend through the output bearing assembly outer carrier 86, the carrier mounting ring 88, and/or the oil sump depending upon the size of the output bearing. For instance, the drawings show a portion 110 of the discharge line entering the output bearing assembly carrier mounting ring 88 from the grease seal 90 before entering the housing interior and oil sump on its way to the discharge port 106. The recess 110 formed in the base weldment plate 24 for the discharge line may be covered with a protective cover 114 to prevent the line from being crushed or kinked during shipping, installation or normal running conditions.

As alluded to earlier, placing the grease seal lines in the interior of the housing so they are submerged in the oil sump allows the grease in the lines to absorb heat from the oil to reduce the viscosity of the grease to aid in pumping the grease the distance the grease must flow from the injection port 94 outside the housing to the discharge port 106 which may be adjacent to the injection port. Having the injection site and the discharge port on the same side of the housing assists the operator in determining that the grease seal has been filled. For instance, the operator does not have to crawl under the equipment to observe the discharge port. The grease lines may comprise SAEJ 525 tubing. The tubing may be bent into shape and welded into the housing structure during the housing welding phase. Once the housing is complete, the housing may be turned upside down and the grease line recesses 100,112 (i.e., fill and/or discharge) may be machined into the bottom weldment plate 24. Compression fittings 116 may be disposed in holes formed in the bottom weldment plate 24 during machining. Holes may also be machined in the output bearing assembly outer carrier 86 and compression fittings 118 may be disposed therein. Small lengths of tubing may extend between the fittings 116,118 in the recesses 100,112, and/or the output bearing assembly outer carrier 86 depending upon the construction. The protective covers 102,114 may be mounted to the bottom plate 24 to keep the fittings 116,118 and respective portions 98,108 of the fill and discharge lines protected.

The oil lubrication system may comprise the pressurized oil supply 46 communicating with a distribution ring 120 disposed between the ring gear support member 36 and the planet gear carrier 54. The distribution ring 120 may be provided in an upper portion of the hollow interior of the gear box adjacent the motor coupling hub 62 and the splines associated with the input shaft 60. Depending upon the application, pressurized oil may enter the housing and flow to the distribution ring before flowing to other components of the planetary gear train. For instance, as shown in FIG. 1, the pressurized oil is directed through the top weldment plate 22 into the housing. The top weldment plate 22 has a depending portion which supports the clutch pack 38. Pressurized oil from the oil supply flows via conduits 122 machined in the depending portion of the top weldment plate 22 to a plenum 124 outwardly, radially adjacent to the distribution ring. In FIGS. 2 and 3, the gear train is not provided with a clutch pack and pressurized oil from the supply is directed through conduits 122' in the intermediate support plate 34 and ring gear support member 36 into the housing to a plenum 124' outwardly, radially adjacent to the distribution ring. The distribution ring 120 may have generally annular inner and outer diameter surfaces with a hollow interior. A channel 126 formed in the distribution ring inner diameter surface may communicate with the hollow interior, and a plurality of radial ports 128 of the distribution ring outer diameter surface (see, e.g., FIG. 1) may communicate with the hollow interior. The distribution ring outer diameter surface radial ports 128 may align with the plenum (124,124') to allow oil to flow from the pressurized oil supply and oil supply conduits (122,122') into the hollow interior of the distribution ring. The distribution ring inner diameter surface may be dimensioned to allow oil to flow from the channel 126 between the distribution ring 120 and the planet gear carrier 54 to other components of the gear train. In an alternate configuration (see, e.g., FIGS. 2-3), the distribution ring may have annular grooves on its outer and inner diameter surface separated by annular web thereby providing the distribution ring with a generally "H"-shaped cross section. Radial holes may be provided through the annular web to allow oil in the outer diameter groove to flow to inner diameter groove. The plenum 124,124' radially outward of the distribution ring 120 may be formed as an annular groove or with radial ports as desired depending upon the configuration of the outer diameter surface of the distribution ring. The distribution ring inner diameter surface may be a babbitted surface that acts as a radial support journal type bearing for an upper portion of the gear train and planet gear carrier 54.

The plenum 124' and/or distribution ring 120 may also supply oil to a spray bar 132. As shown in FIGS. 2 and 3, the spray bar 132 extends vertically from the plenum 124' radially outward of the distribution ring and upward in the interior of the housing. The spray bar may be directed to the motor coupling hub 62 and other areas of the splined coupling spool upper mesh. The arrangement of the planetary gear system of FIG. 1 may not include a spray bar given the position of the clutch pack 38 and the depending portion of the top weldment plate 22. However, in an embodiment such as that of FIG. 1, oil may be supplied to the motor coupling hub 62 and the spline coupling spool upper mesh via spray lines 134 formed in an upper portion of the planet gear carrier 54 that communicate with the distribution ring 120. In the alternative, spray lines and or a nozzle may communicate with the conduits 122 of the top weldment plate 22 or the depending portion of the top weldment plate, for instance, a piston carrier of the clutch pack 38.

Oil from the distribution ring channel 126 between the distribution ring 120 and the upper portion of the planet gear carrier 54 may flow downward along the upper portion of the planet gear carrier 54 and supply an upper radial bearing 136 disposed below the distribution ring. Oil that flows through the upper radial bearing 136 may be directed across the top of the planet gear carrier 54 due to centrifugal force and be directed to the planet ring gear mesh 72 and splines between the ring gear 56 and the ring gear carrier 68. Given the vertical orientation of the planetary gear train, oil exiting from these locations may fall to the oil sump 40 located at the bottom of the housing.

The planet gear carrier upper portion may have radial ports 142 which face the distribution ring inner channel 126 and receive pressurized oil from the distribution ring channel. In the alternative, an annular groove may be provided in the upper portion of the planet gear carrier in lieu of the radial ports. The radial ports 142 may communicate with planet gear carrier oil supply passages 144 formed in the planet gear carrier 54 that supply pressurized oil to other locations and components in the gear train. For instance, the planet gear carrier oil supply passages 144 may provide oil to each of the planet gear spindles 66 via one or more planet gear spindle oil supply passage(s) 146, and oil to the sun planet gear mesh 70 and the planet ring gear mesh 72 via one or more planet gear mesh oil supply passage(s) 148. As shown in the drawings, axial and radial holes are drilled or cast in the planet gear carrier 54 in an intersecting fashion to create the planet gear carrier oil supply passage(s) 144, the planet gear spindle oil supply passage(s) 146, and/or the planet gear mesh oil supply passage(s) 148. To direct oil as needed through these passages, pipe plugs or seals 150 may be provided. Nozzles 152 may be mechanically connected to certain passageways in lieu of the pipe seals or plugs to provide a desired spray pattern. While the description that follows may refer to certain components as singular or as one component, this is merely for ease of illustration and not to limit the number of the subject components or elements in any way. Any such component may be one of a plurality of components or elements.

Figure 4:
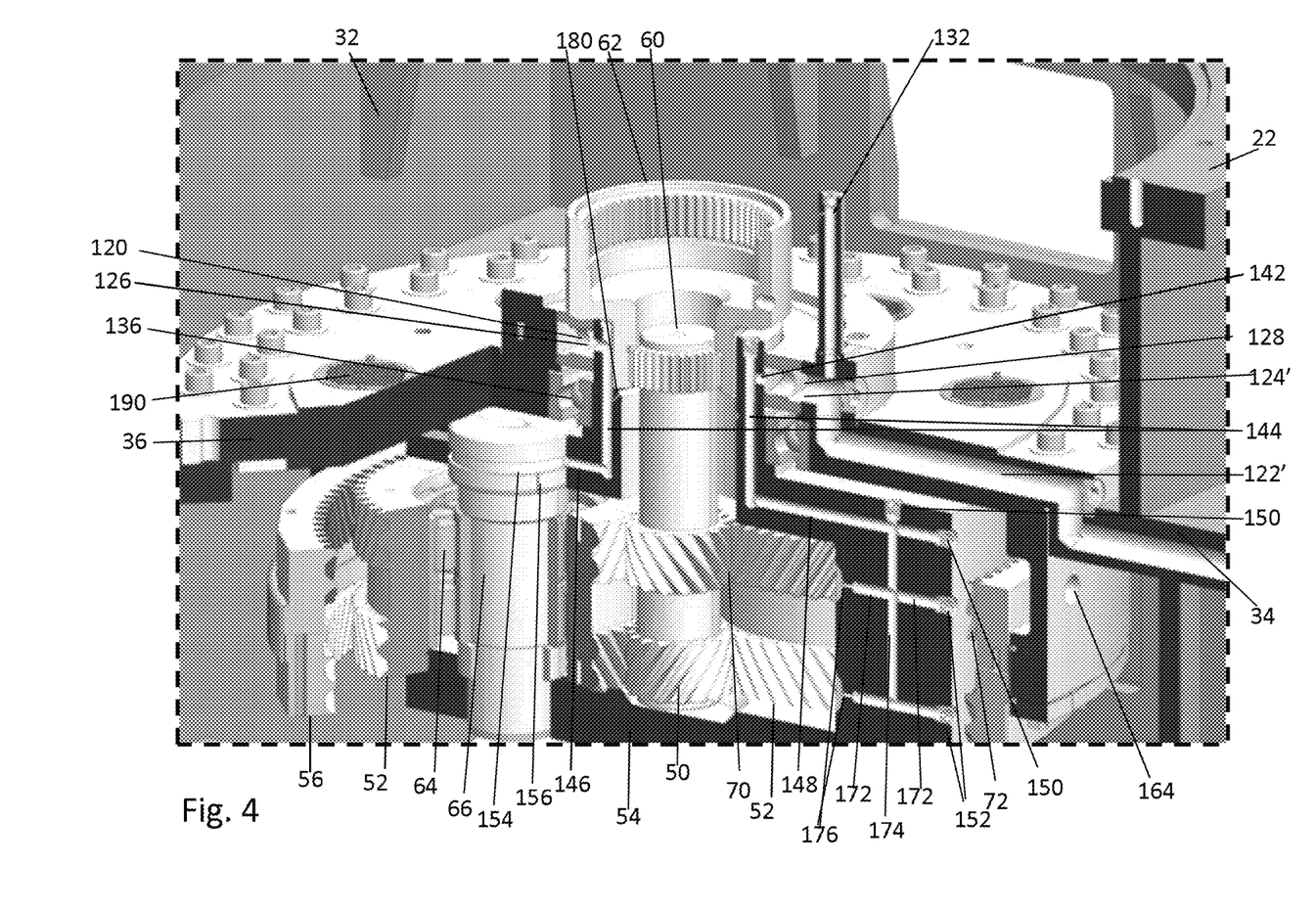
FIG. 4 is an enlarged view taken from detail area 4-4 of FIG. 3.

The planet gear carrier oil supply passages 144 may generally comprise vertically extending holes machined or cast into the planet gear carrier 54. Certain of the planet gear carrier oil supply passages 144 communicate with the planet gear spindle oil supply passage 146 to supply to the planet gear bearings 64. The planet gear spindle oil supply passage 146 may include an annular ring 154 that is formed on an axial end of the planet gear spindle 66. The planet gear spindle 66 may have its upper axial end sized with a diameter that is between the diameter of the inner and outer races of the planet gear bearing 64. The annular ring 154 formed on the axial end of the planet gear spindle 66 may have axial slots 156 that extend toward the planet gear bearings 64. Oil that is supplied to the annular ring 154 via the planet gear spindle oil supply passage 146 may flow through the annular ring and through the axial slots 156. The axial slots 156 are positioned in such a way that the oil flows from annular ring 154 and the axial slots into the area between the inner and outer races of the planet gear bearing 64, thereby lubricating the rotational elements of the planet gear bearing. The annular ring and axial slots may supply oil to all of the bearings 64 of the planet gear and planet gear spindle 66, for instance, as shown in FIG. 4, the upper and lower bearings and their corresponding rotational elements. Oil exiting from the planet gear bearings 64 may flow along the planet gear spindle 66 to the oil sump 40. A set screw 158 may extend from the outer surface of the planet gear carrier 54 to the planet gear spindle 66 to engage the annular ring 154 and prevent axial motion of the spindle 66 in the planet gear carrier. Holes 164 may be provided in the annular depending portion of ring gear support member 36 to allow oil from the planet ring gear mesh 72 to flow around the outer diameter surface of the ring gear support annular depending portion into the sump. The holes 164 located in the ring gear support annular depending portion allow excess oil to return to the sump and may reduce churning losses. Depending upon the application, the planet gear spindle oil supply passage 146 may also include an axial portion 166 that extends through the planet gear spindle 66. The axial portion 166 may have radial ports 168 along its length to direct oil to the planet gear bearing 64. FIG. 1 shows a configuration where the planet gear spindle oil supply passage 146 includes an axial portion 166 extending through a center line of the spindle 66 and radial ports 168 extending from the axial portion to the planet gear spindle bearings 64.

Figure 7:
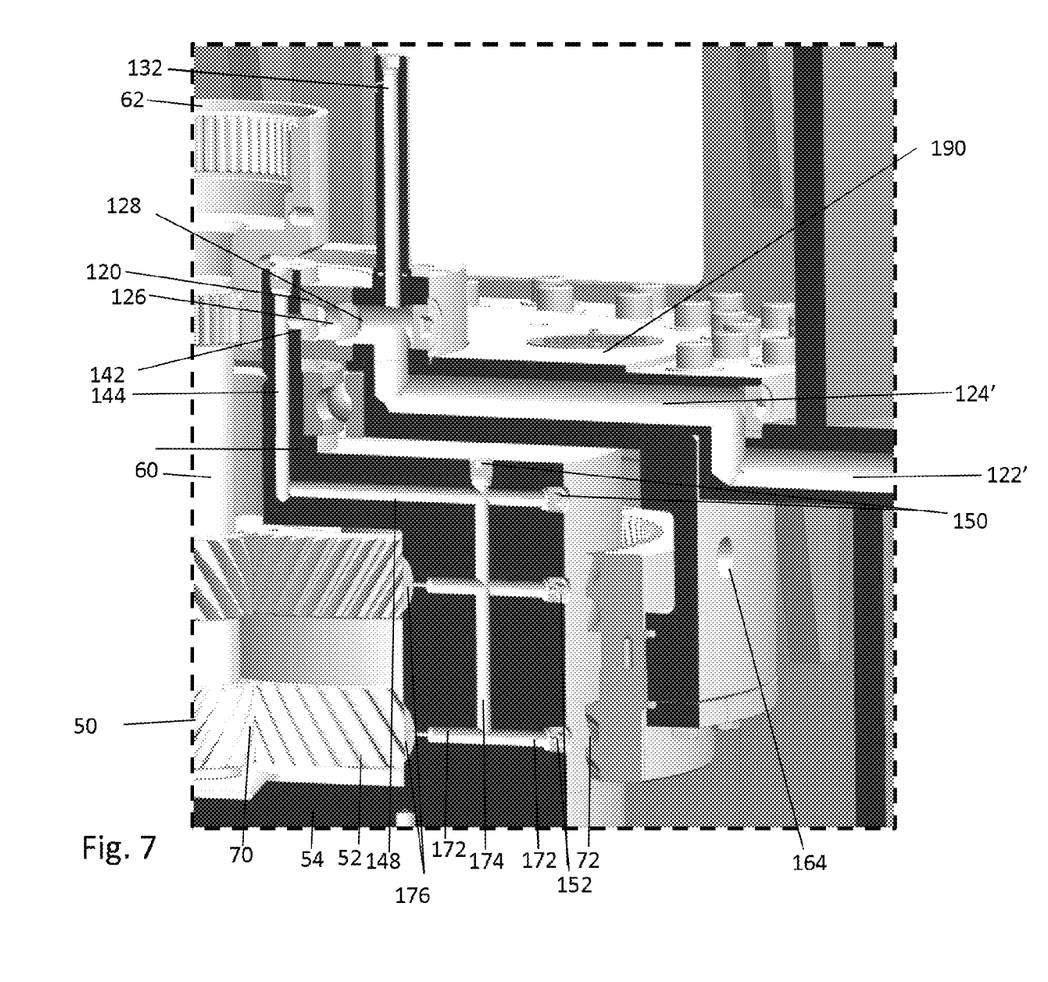
FIG. 7 is an enlarged view taken from detail area 7-7 of FIG. 2.
Figure 8:
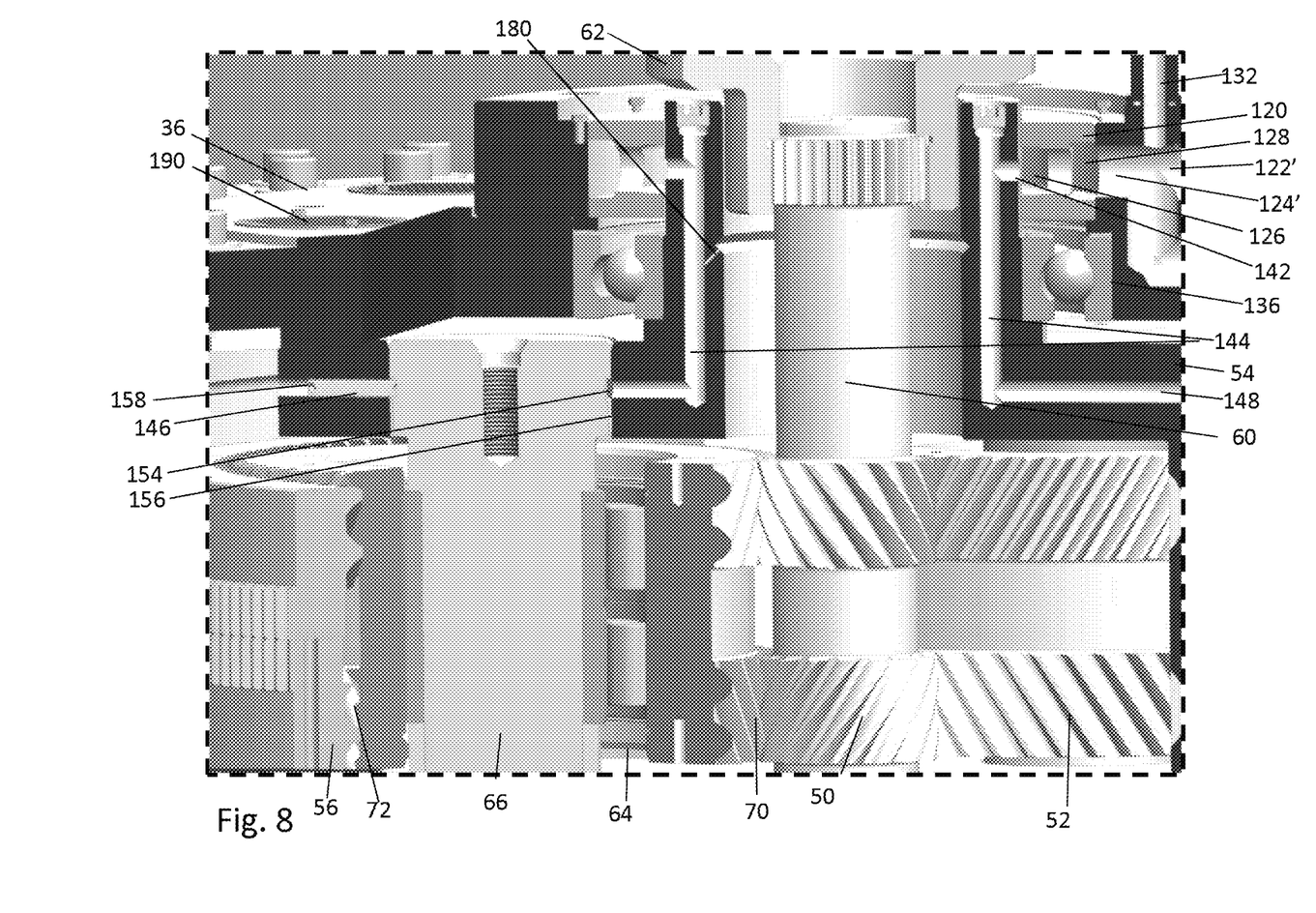
FIG. 8 is an enlarged view taken from detail area 8-8 of FIG. 2.

The planet gear carrier oil supply passages 144 may also communicate with the planet gear mesh oil supply passage 148. For instance, certain planet gear carrier oil supply passages comprising generally vertically extending holes that are machined or cast into the planet gear carrier 54 may intersect with the planet gear mesh oil supply passage 148. The planet gear mesh oil supply passage 148 may have a radial portion 172 that extends through the planet gear carrier 54 and a vertical portion 174 throughout the plant gear carrier as necessary to deliver oil to the sun planet gear mesh 70 and the planet ring gear mesh 72. The radial portions 172 may be configured to extend in inward and outward radial directions, supplying oil to both the sun planet gear mesh 70 and the planet ring gear mesh 72. The radial portions 172 may have discharges with mechanical fitting type nozzles 152 that supply oil to the sun planet gear mesh 70 and/or the planet ring gear mesh 72. The radial portions 172 may have discharges 176 formed in the planet gear carrier to provide a fanning nozzle effect to supply oil to the sun planet gear mesh 70 and/or the planet ring gear mesh 72. For instance, in FIG. 7, the outward radial passages 172 have mechanical fitting nozzles 152 that are mechanically connected with the planer gear carrier, for instance, threaded into the radial passage. The opposite inner radial passage 172 may have a necked down region (i.e., a throat) leading to a concave discharge formed monolithically in the planet gear carrier. The necked down region and concavity provide a wide fanning spray pattern to lubricate the width of the gear face. Oil delivered to the area of the planet ring gear mesh 72 may flow through the holes 164 of the annular depending portion of the ring gear support member 36 to allow excess oil to return to the sump 40, which may reduce churning losses.

Figure 5:
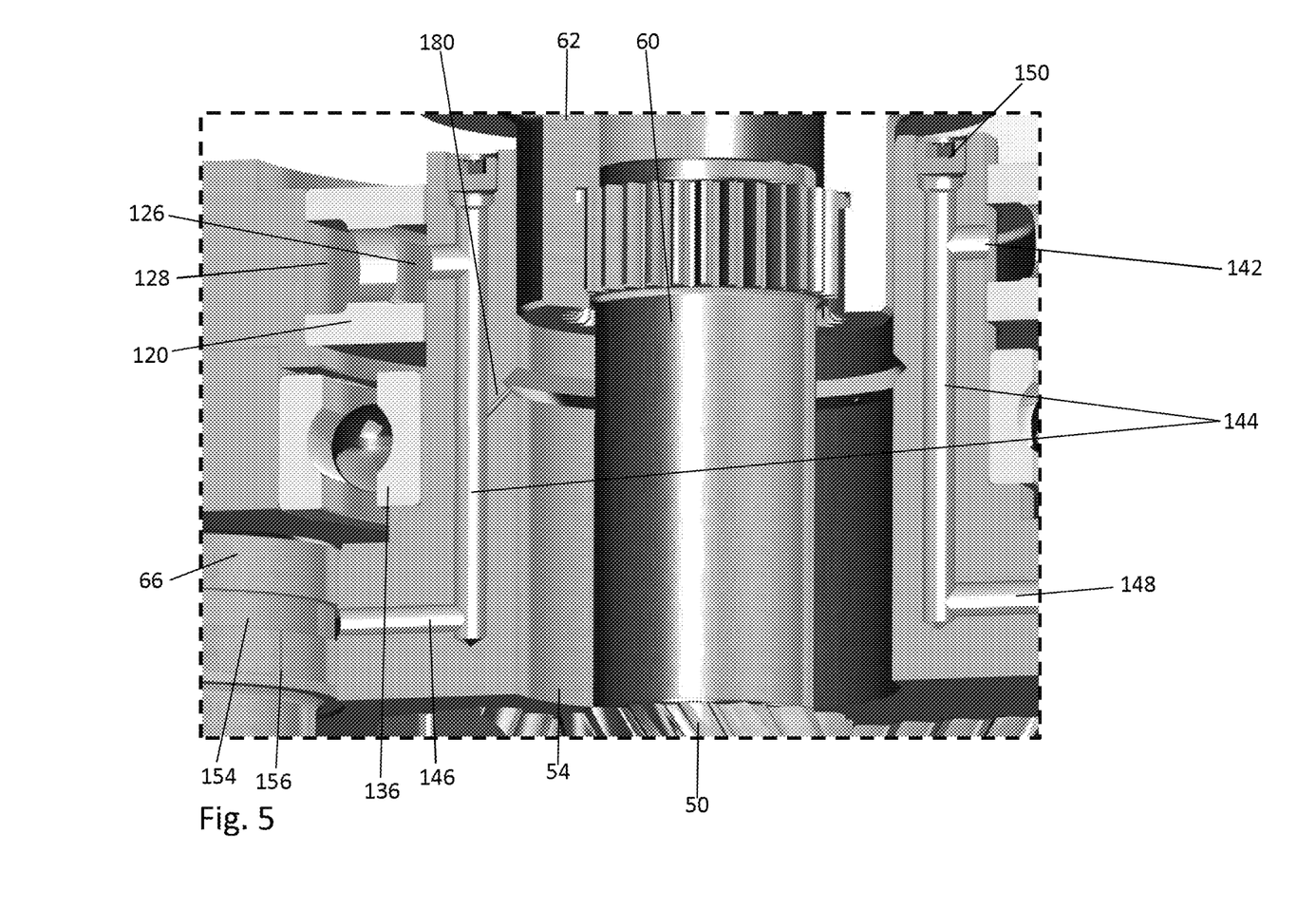
FIG. 5 is an enlarged view taken from detail area 5-5 of FIG. 3.
Figure 6:
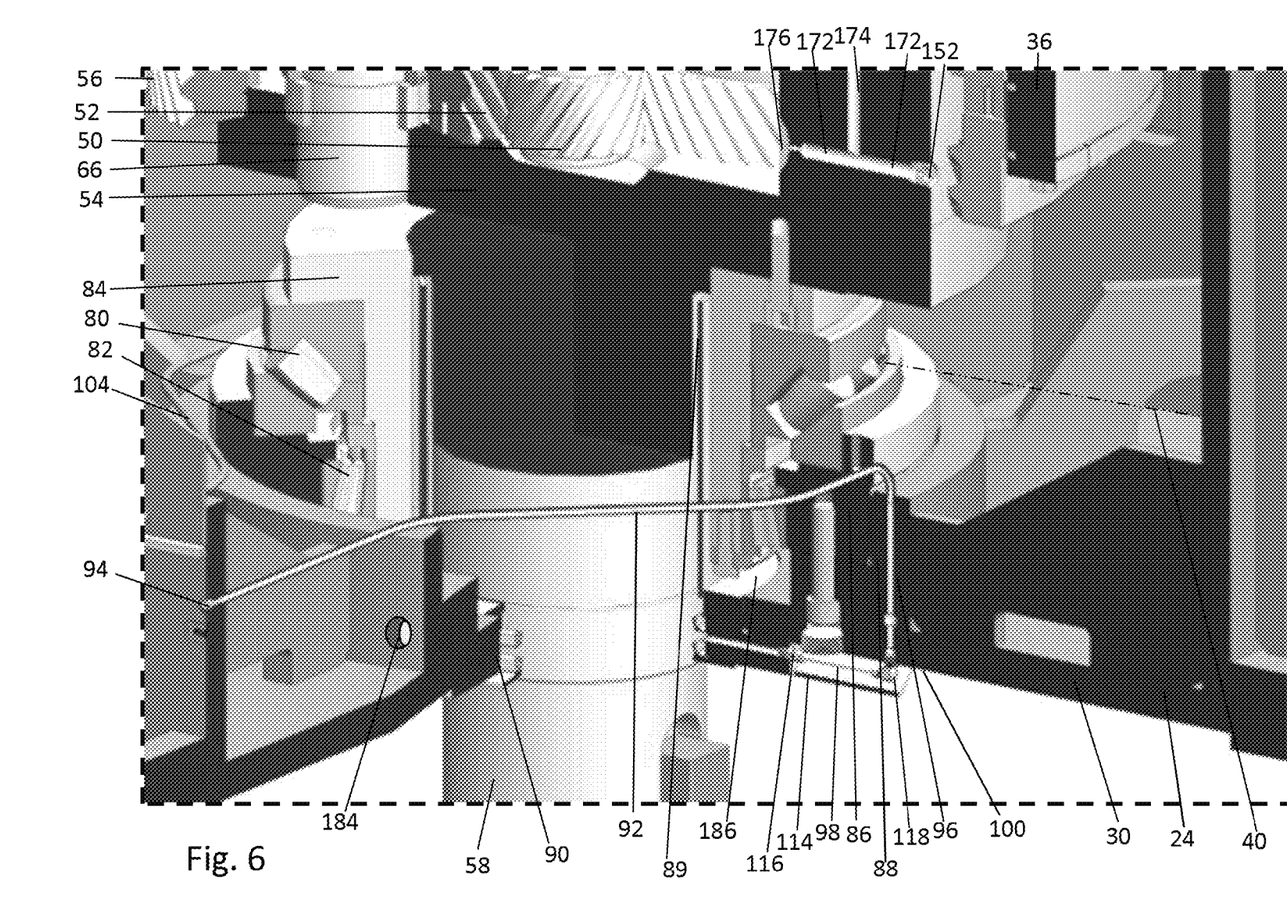
FIG. 6 is an enlarged view taken from detail area 6-6 of FIG. 3.

The planet gear carrier oil supply passage 144 may also have one or more conduits 180 that inject oil into the splined motor coupling hub 62 and the sun planet gear mesh 70. For instance, as shown in FIG. 5, the planet gear carrier oil supply passage 144 extends in a vertical orientation from the distribution ring 120. An obliquely angled conduit 180 is formed between the planet gear carrier oil supply passage 144 and an interior surface of the planet gear carrier 54. The conduit 180 may be configured to allow pressurized oil to spray upward into the splined connection of the input shaft and motor coupling hub 62. Oil may then flow downward along the input shaft 60 to lubricate the sun planet gear mesh 70.

Figure 9:
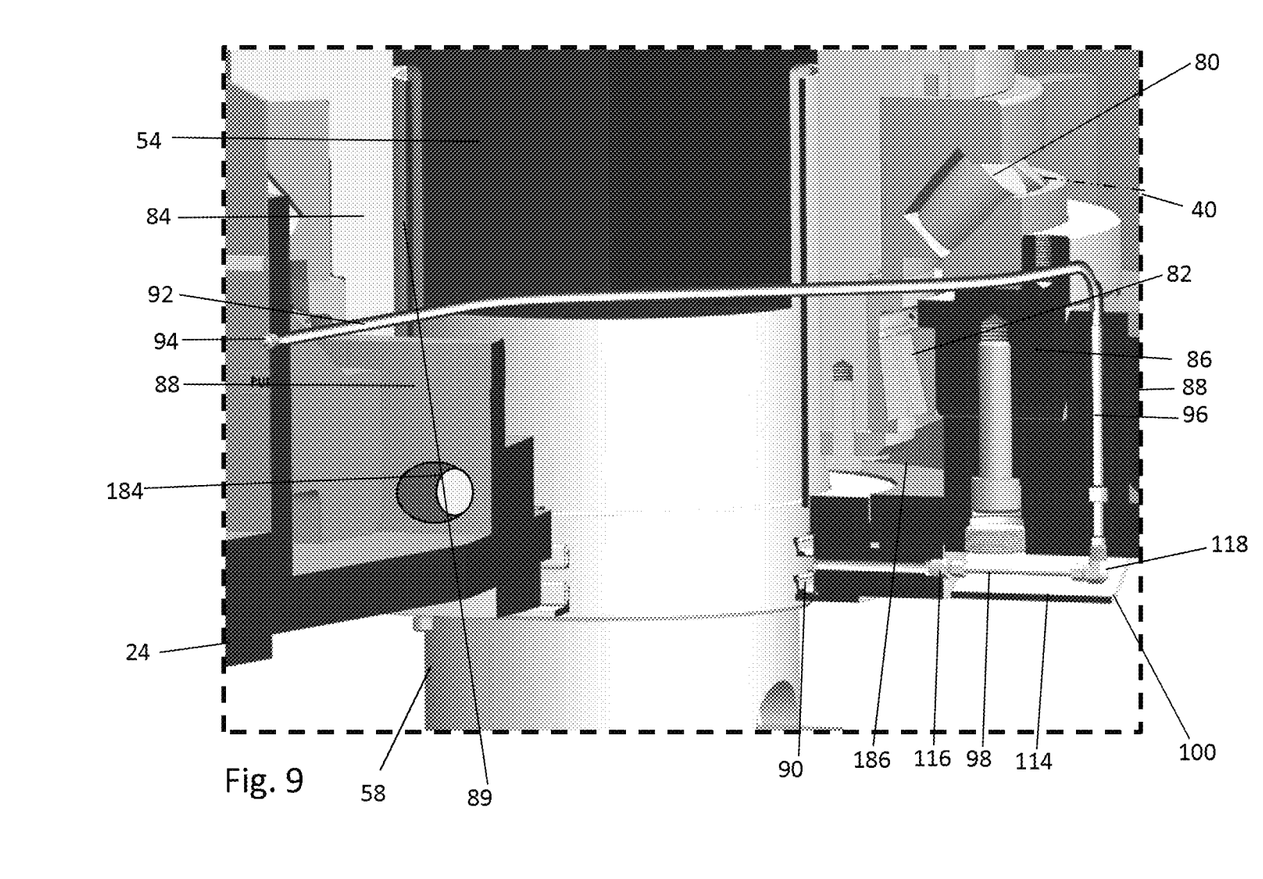
FIG. 9 is an enlarged view taken from detail area 9-9 of FIG. 2.
Figure 10:
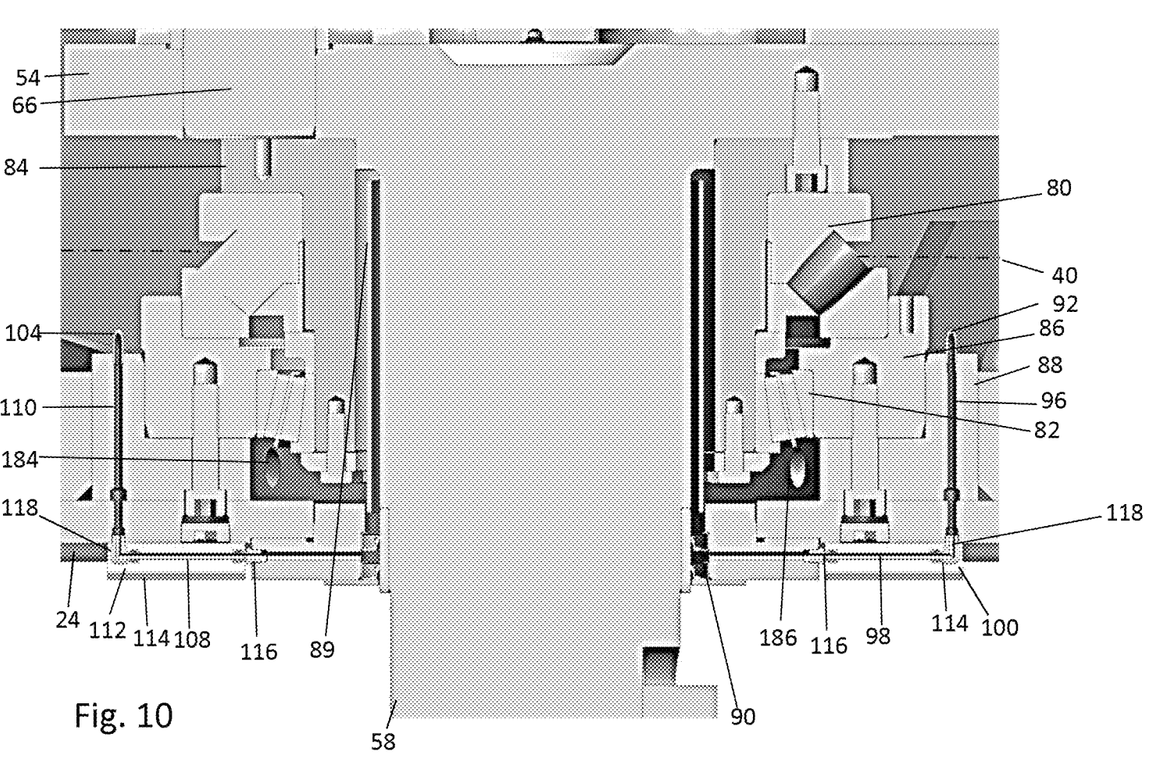
FIG. 10 is a cross-sectional view generally similar to detail area 9-9 of FIG. 2.

The output bearings 80,82 may be lubricated by oil in the sump 40. Preferably, the oil level of the sump (the dashed line of FIGS. 1, 6, 9, 10) is set to correspond with the upper-most rotational elements associated with the output bearing assembly. For instance, the oil level of the sump 40 may be maintained such that it is between the inner and outer races associated with the lower thrust bearing 80 of the output bearing assembly. As shown in FIGS. 9 and 10, the output bearing assembly comprises the lower spherical thrust bearing 80 and the tapered roller bearing 82. The inner and outer races for each of the spherical thrust bearing and the tapered roller bearing are respectively contained within the output bearing assembly inner carrier 84 and the output bearing assembly outer carrier 86. The output bearing assembly inner carrier 84 may be mounted to the planet gear carrier 54. The output bearing assembly outer carrier 86 may be mounted to the carrier mounting ring 88 formed at the base of the housing projecting upward from the base weldment plate 24. To allow oil flow through the components of the output bearing assembly, including through the rotational elements associated with the spherical thrust bearing 80 and the tapered roller bearing 82, radially oriented holes 184 are provided in the outer carrier mounting ring 88, and/or the output bearing assembly outer carrier 86, and other associated structures of the housing. The radially oriented holes 184 allow oil to flow between the races of the spherical thrust bearing 80 to the tapered roller bearing 82 into an annular cavity 186 formed between the output bearing assembly outer and inner carriers 84,86, the output shaft 58 and the outer carrier mounting ring 88. Oil may collect in the annular cavity 186 and flow through the radially oriented holes 184 into the sump 40 with oil circulation being provided by the pumping action of the rotational elements of the spherical thrust bearing 80 and the tapered roller bearing 82. The radially oriented holes 184 in the output bearing assembly outer carrier 86 promote circulation to assist in removing heat from the bearings and providing adequate lubrication for the spherical thrust bearing 80 and tapered roller bearing 82. In addition to the bearing carrier mounting ring 88, the output bearing assembly outer carrier 86 may have radially oriented recirculation holes, and depending upon the construction of the housing, annular rings providing structural support for the housing that may surround the output bearing assembly bearing carrier 84,86 may also have recirculation holes to allow circulation of oil between the annular cavity 186 and the sump 40.

The ring gear support member 36 may also have holes 190 formed in its horizontal plate portion. Oil from the spray bar 132 and distribution ring 120 which flows radially outward on the top surface of the horizontal plate portion of the ring gear support member 36 may flow through the holes 190 into the planet ring gear mesh 72 and into the sump 40. Additionally, oil from the clutch 38 may flow through the holes 190 of the horizontal plate portion of the ring gear support member 36 into the planet ring gear mesh 72 and into the sump 40. The holes 164 in the depending portion of the ring gear support member 36 provide another path for oil delivered to the planet ring gear mesh 72 to flow into the sump 40.

By using the oil lubrication system described herein, the amount of lubricant in the system may be reduced to reduce churning losses and improve efficiency. The system ensures positive oil flow to all components utilizing a minimum amount of oil. Churning losses may be minimized due to the generally low oil levels in housing and using pressurized lubricant to overcome internal rotational forces that would otherwise be present were higher oil levels used in the gear box.

In view of the foregoing, it will be seen that the several advantages are achieved and attained. The embodiments were chosen and described in order to best explain practical applications to thereby enable others skilled in the art to best utilize the various embodiments and modifications as are suited to a particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A gear system for a gear motor, the gear motor comprising:
   a planetary gear train comprising a sun pinion, the sun pinion engaging at least one planet gear at a sun planet gear mesh, the at least one planet gear being rotatably mounted to a planet gear carrier, the planet gear carrier being configured to drive an output shaft, the output shaft being configured to be operatively connected to a load, the at least one planet gear rotating within a ring gear and engaging the ring gear at a planet gear ring mesh; and
   a distribution ring with a hollow interior and a channel formed on its inner diameter communicating with the hollow interior, the distribution ring hollow interior being configured to receive oil from an oil supply for lubricating the planetary gear train, the distribution ring inner diameter surrounding a portion of the planet gear carrier and being dimensioned to allow oil to flow from the distribution ring hollow interior through the channel and between the planet gear carrier and the distribution ring along the planet gear carrier to lubricate (i) the planet gear ring mesh and (ii) a bearing radially supporting the planet gear carrier within a housing of the gear motor, the planet carrier radial support bearing being located below the distribution ring.

2. The gear system of claim 1 further comprising a planet gear carrier oil supply passage extending through the planet gear carrier and communicating with the distribution ring, the planet gear carrier oil supply passage being configured to supply oil to the sun planet gear mesh and the planet ring gear mesh, and bearings of the planetary gear train.

3. The gear system of claim 2, wherein the at least one planet gear is configured to rotate around a planet gear spindle of the planet gear carrier with a planet gear bearing disposed between the at least one planet gear and the planet gear spindle; and further comprising a planet gear spindle oil supply passage extending through the planet gear carrier and communicating with the planet gear carrier oil supply passage, the planet gear spindle oil supply passage being configured to supply lubricating oil to the planet gear bearing of the at least one planet gear, the planet gear spindle oil supply passage including an annular ring formed on an axial end of a planet gear spindle and including axial slots extending from the annular ring toward the planet gear bearing.

4. The gear system of claim 1, further comprising a motor coupling hub operatively connected to the sun pinion, and a spray bar communicating with the distribution ring being configured to deliver oil to the motor coupling hub.

5. The gear system of claim 1, further comprising a ring gear support member supporting the ring gear relative to the planet carrier, and a radial bearing disposed between the ring gear support member and the planet gear carrier, the radial bearing configured to receive oil from the distribution ring.

6. The gear system of claim 5 wherein the ring gear support member has holes configured to supply oil to the planet ring gear mesh.

7. The gear system of claim 5 wherein the ring gear support member has holes configured to supply oil to an oil sump.

8. The gear system of claim 5, further comprising a clutch operatively connected to the ring gear support member.

9. The gear system of claim 8 wherein the clutch has a discharge configured to allow oil discharged from the clutch to flow from the clutch discharge through the ring gear support holes to the planet ring gear mesh.

10. The gear system of claim 2, further comprising a planet gear mesh oil supply passage extending through the planet gear carrier and communicating with the planet gear carrier oil supply passage, the planet gear mesh oil supply passage being configured to supply lubricating oil to the sun planet gear mesh.

11. The gear system of claim 2, further comprising a planet gear mesh oil supply passage extending through the planet gear carrier and communicating with the planet gear carrier oil supply passage, the planet gear mesh oil supply passage being configured to supply lubricating oil to the planet ring gear mesh.

12. A gear system for a gear motor, the gear motor comprising:
    a planetary gear train comprising a sun pinion, the sun pinion engaging at least one planet gear at a sun planet gear mesh, the at least one planet gear being rotatably mounted to a planet gear carrier, the planet gear carrier being configured to drive an output shaft, the output shaft being configured to be operatively connected to a load, the at least one planet gear rotating within a ring gear and engaging the ring gear at a planet gear ring mesh;

a distribution ring with a hollow interior and a channel formed on its inner diameter communicating with the hollow interior, the distribution ring hollow interior being configured to receive oil from an oil supply for lubricating the planetary gear train, the distribution ring inner diameter surrounding a portion of the planet gear carrier and being dimensioned to allow oil to flow from the distribution ring hollow interior through the channel between the planet gear carrier and the distribution ring to lubricate at least one component of the gear train;

a planet gear carrier oil supply passage extending through the planet gear carrier and communicating with the distribution ring, the planet gear carrier oil supply passage being configured to supply oil to the sun planet gear mesh and the planet ring gear mesh, and bearings of the planetary gear train; and a motor coupling hub operatively connected to the sun pinion, and a coupling hub oil supply conduit communicating with the planet gear carrier oil supply passage, the coupling hub oil supply conduit being configured to deliver oil to the motor coupling hub.

13. A gear system for a vertical gear motor, the gear motor comprising:

a planetary gear train comprising a sun pinion engaging at least one planet gear at a sun planet gear mesh, the at least one planet gear being rotatably mounted to a planet gear carrier, the at least one planet gear being configured to rotate around a planet gear spindle of the planet gear carrier with a planet gear bearing disposed between the at least one planet gear and the planet gear spindle, the planet gear carrier being configured to drive an output shaft, the output shaft being configured to be operatively connected to a load, the at least one planet gear rotating within a ring gear and engaging the ring gear at a planet ring gear mesh;

a distribution ring disposed around the planet gear carrier and having a hollow interior, the distribution ring hollow interior being configured to receive oil from an oil supply for lubricating the planetary gear train;

a planet gear carrier oil supply passage extending through the planet gear carrier and communicating with the distribution ring hollow interior; and a planet gear spindle oil supply passage extending through the planet gear carrier and communicating with the planet gear carrier oil supply passage, the planet gear spindle oil supply passage being configured to supply lubricating oil to the planet gear bearing of the at least one planet gear, the planet gear spindle oil supply passage including an annular ring formed on an exterior surface of an axial end of the planet gear spindle and including axial slots extending along the exterior surface of the axial end of the planet gear spindle from the annular ring toward the planet gear bearing.

14. The gear system of claim 13 wherein the axial end of the planet gear spindle is sized such that the axial slots extending from the annular ring are aligned with rotational elements of the planet gear spindle bearing.

15. The gear system of claim 13 wherein the planet gear spindle oil supply passage includes a passage extending axially through the planet gear spindle and radially to the bearing of the at least one planet gear.

16. A gear system for a vertical gear motor, the gear motor comprising:

a planetary gear train comprising a sun pinion engaging at least one planet gear at a sun planet gear mesh, the at least one planet gear being rotatably mounted to a planet gear carrier, the planet gear carrier being configured to drive an output shaft, the output shaft being configured to be operatively connected to a load, the at least one planet gear rotating within a ring gear and engaging the ring gear at a planet gear ring mesh;

a distribution ring disposed around the planet gear carrier and having a hollow interior configured to receive oil from an oil supply for lubricating the planetary gear train;

a planet gear carrier oil supply passage extending through the planet gear carrier and communicating with the distribution ring hollow interior; and a planet gear mesh oil supply passage extending through the planet gear carrier and communicating with the planet gear carrier oil supply passage, the planet gear mesh oil supply passage being configured to supply lubricating oil to at least one of the sun planet gear mesh and the planet gear ring mesh;

wherein the distribution ring inner diameter is dimensioned to allow oil to flow from the distribution ring hollow interior and between the planet gear carrier and the distribution ring along the planet gear carrier to lubricate (i) the planet pear rind mesh, and (ii) a bearing radially supporting the planet gear carrier within a housing of the gear motor, the planet carrier radial support bearing being located below the distribution ring.

17. The gear system of claim 16 wherein the planet gear mesh oil supply passage supplies lubricating oil to at least one of the sun planet gear mesh and the planet gear ring mesh via a nozzle.

18. The gear system of claim 17 wherein the nozzle comprises a necked down region and discharge monolithically formed in the planet carrier.

19. The gear system of claim 17 wherein the nozzle is mechanically connected with the planet gear carrier.

20. A gear system for a gear motor, the gear motor comprising:

a planetary gear train comprising a sun pinion, the sun pinion engaging at least one planet gear at a sun planet gear mesh, the at least one planet gear being rotatably mounted to a planet gear carrier, the planet gear carrier being configured to drive an output shaft, the output shaft being configured to be operatively connected to a load, the at least one planet gear rotating within a ring gear and engaging the ring gear at a planet gear ring mesh; and a housing for the gear train, the housing having a mounting ring carrier to support an output bearing for the output shaft wherein at least part of the output bearing is disposed within an oil sump, the oil sump being formed within the housing at a base of the housing, the mounting ring carrier having radial holes positioned axially outboard of the output bearing, the radial holes communicating with the oil sump, the output bearing being positioned in the sump in a manner to form a flow path from the oil sump through the output bearing through the radial holes and into the oil sump.

* * * * *